(12) United States Patent
Suzuki

(10) Patent No.: US 7,185,641 B2
(45) Date of Patent: Mar. 6, 2007

(54) CONTROL APPARATUS OF INTERNAL COMBUSTION ENGINE

(75) Inventor: Naoto Suzuki, Fujinomiya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 115 days.

(21) Appl. No.: 11/033,500

(22) Filed: Jan. 12, 2005

(65) Prior Publication Data

US 2005/0155587 A1    Jul. 21, 2005

(30) Foreign Application Priority Data

Jan. 15, 2004   (JP)   ............................. 2004-007779

(51) Int. Cl.
*F02M 37/04* (2006.01)
(52) U.S. Cl. .................. 123/520; 123/568.19
(58) Field of Classification Search ................ 123/516, 123/518, 519, 520, 521, 568.19, 350, 396
See application file for complete search history.

(56) References Cited

U.S. PATENT DOCUMENTS

| | | | |
|---|---|---|---|
| 5,213,087 A * | 5/1993 | Sausner et al. | ............. 123/400 |
| 5,727,528 A | 3/1998 | Hori et al. | |
| 6,109,249 A * | 8/2000 | Wild et al. | ............. 123/568.21 |
| 6,247,457 B1 * | 6/2001 | Mallebrein | ................... 123/520 |
| 6,390,083 B2 * | 5/2002 | Oki et al. | ................... 123/698 |
| 6,438,945 B1 * | 8/2002 | Takagi et al. | ................. 60/283 |
| 6,732,723 B2 * | 5/2004 | van Nieuwstadt | ...... 123/568.19 |
| 6,866,020 B2 * | 3/2005 | Allston et al. | ............. 123/399 |

FOREIGN PATENT DOCUMENTS

| | | |
|---|---|---|
| JP | 08-317507 | 11/1996 |
| JP | 09-250376 | 9/1997 |
| JP | 10-115258 | 5/1998 |
| JP | 10-213015 | 8/1998 |

* cited by examiner

Primary Examiner—Carl S. Miller
(74) Attorney, Agent, or Firm—Kenyon & Kenyon LLP

(57) ABSTRACT

Both evaporated fuel purge and EGR are performed by supplying both an evaporated fuel and an exhaust gas at a position downstream from a throttle valve, of an intake pipe. A controller for controlling a purge flow rate and an EGR flow rate controls an opening degree of a purge control valve and an opening degree of the throttle valve, for example, as an operational state of an engine to compensate for a decrease in the purge flow rate caused by an increase in the EGR flow rate.

1 Claim, 6 Drawing Sheets

CONTROL APPARATUS OF INTERNAL COMBUSTION ENGINE

BACKGROUND OF THE INVENTION

1. Field of the Invention

The present invention relates to a control apparatus of an internal combustion engine for controlling the supply of evaporated fuel gas and exhaust gas downstream from a throttle valve of an intake pipe.

2. Description of the Related Art

In an internal combustion engine, a process known as "evaporated fuel purge" is performed to temporarily store an evaporated fuel gas occurring in a fuel tank in a canister, and, by supplying the stored evaporated fuel gas into an intake pipe, thereby combusting the evaporated fuel gas in a combustion chamber. A process known as EGR for refluxing an exhaust gas flowing through an exhaust pipe into the intake pipe is also performed. Related art which performs the evaporated fuel purge and EGR is disclosed in Japanese Patent Laid-Open Publication No. Hei 10-115258. As described in that publication, the EGR rate and the purge rate are suppressed and the region where the purge rate becomes constant is enlarged while the evaporation concentration exceeds a set value and, when the evaporation concentration reduces to the set value or less and has less influence as disturbance, the purge rate and the EGR rate are increased. Thereby, enhancement in fuel economy and reduction in exhaust emission by the EGR are carried out while securing the evaporated fuel purge ability.

In other related art, control of a throttle opening degree of an internal combustion engine is disclosed in Japanese Patent Laid-Open Publication No. Hei 9-250376, Japanese Patent Laid-Open Publication No. Hei 10-213015 and Japanese Patent Laid-Open Publication No. Hei 8-317507.

In the aforementioned art, the purge rate and the EGR rate are both increased when the evaporation concentration reduces to the set value or less. However, the pressure of the exhaust gas is higher than that of the evaporated fuel gas, and, therefore, the exhaust gas flows into the intake pipe more easily than the evaporated fuel gas. Accordingly, it is difficult to sufficiently increase the purge amount with respect to the increase in the EGR amount, thus creating the problem that a desired purge amount cannot be reliably or easily secured.

SUMMARY OF THE INVENTION

The present invention advantageously provides an internal combustion engine control apparatus capable of sufficiently securing a desired purge amount even when an EGR amount is increased.

An internal combustion engine control apparatus according to the present invention is a control apparatus for controlling a supply amount of an evaporated fuel and a supply amount of an exhaust gas downstream side from a throttle valve of an intake pipe, and is characterized by including a compensation control device for controlling an operational state of the internal combustion engine so that a decrease in the supply amount of the evaporated fuel caused by an increase in the supply amount of the exhaust gas is compensated.

According to the present invention, even if the EGR amount is increased, a desired purge amount can be secured by controlling the operational state of the internal combustion engine to compensate for the decrease in the supply amount of the evaporated fuel caused by the increase in the supply amount of the exhaust gas in the downstream side from the throttle valve, of the intake pipe.

In the control apparatus of the internal combustion engine according to the present invention, the aforesaid compensation control device may control an opening degree of the throttle valve to compensate for the decrease in the supply amount of the evaporated fuel caused by the increase in the supply amount of the exhaust gas. In this way, the decrease in the negative pressure in the intake pipe caused by the increase in the EGR amount can be compensated for.

In the control apparatus of the internal combustion engine according to the present invention of the mode of controlling the opening degree of the throttle valve, the aforesaid compensation control device may calculate a compensation amount of the opening degree of the throttle valve in accordance with the supply amount of the exhaust gas and may control the opening degree of the throttle valve based on the compensation amount. In this way, the necessary negative pressure in the intake pipe for supplying the evaporated fuel to the intake valve can be secured in accordance with the EGR amount.

In the control apparatus of the internal combustion engine according to the present invention of the mode of controlling the opening degree of the throttle valve, the aforesaid compensation control device may restrict the opening degree of the throttle valve so that the opening degree of the throttle valve does not exceed an upper limit value. In this way, the necessary negative pressure in the intake pipe for supplying the evaporated fuel into the intake pipe can be secured.

In the control apparatus of the internal combustion engine according to the present invention of the mode of restricting the opening degree of the throttle valve, the aforesaid compensation control device can change the upper limit value in accordance with the supply amount of the exhaust gas. In this way, the necessary negative pressure in the intake pipe for supplying the evaporated fuel into the intake valve can be secured in accordance with the EGR amount.

In the control apparatus of the internal combustion engine according to the present invention of the mode of changing the upper limit value, the aforesaid compensation control device may change the upper limit value in accordance with the supply amount of the exhaust gas so that negative pressure in the downstream side from the throttle valve, of the intake pipe becomes substantially constant when the opening degree of the throttle valve is at the upper limit value. In this way, even if the EGR amount changes, a predetermined amount or more of the negative pressure in the intake pipe can be secured.

In the control apparatus of the internal combustion engine according to the present invention, the supply amount of the evaporated fuel is controlled by controlling an opening degree of a purge control valve, and the aforesaid compensation control device may control the opening degree of the purge control valve so as to compensate for the decrease in the supply amount of the evaporated fuel caused by the increase in the supply amount of the exhaust gas. In this way, the decrease in the supply amount of the evaporated fuel caused by the increase in the EGR amount can be compensated by the control of the opening degree of the purge control valve.

In the control apparatus of the internal combustion engine according to the present invention of the mode of controlling the opening degree of the purge control valve, the aforesaid compensation control device may calculate a compensation amount of the opening degree of the purge control valve in accordance with the supply amount of the exhaust gas, and may control the opening degree of the purge control valve based on the compensation amount. In this way, the opening degree of the purge control valve can be compensated in accordance with the EGR amount.

In the control apparatus of the internal combustion engine according to the present invention of the mode of controlling the opening degree of the purge control valve, the aforesaid compensation control device may control the opening degree of the throttle valve to compensate for the decrease in the supply amount of the evaporated fuel, when determining that a desired supply amount of evaporated fuel cannot be obtained by the control of the opening degree of the purge control valve. In this way, even when the desired purge amount cannot be obtained by the control of the opening degree of the purge control valve, the desired purge amount can be sufficiently secured by the control of the opening degree of the throttle valve.

DESCRIPTION OF THE PREFERRED EMBODIMENT

Hereinafter, a preferred embodiment of the present invention will be explained in accordance with the drawings.

Figure 1:
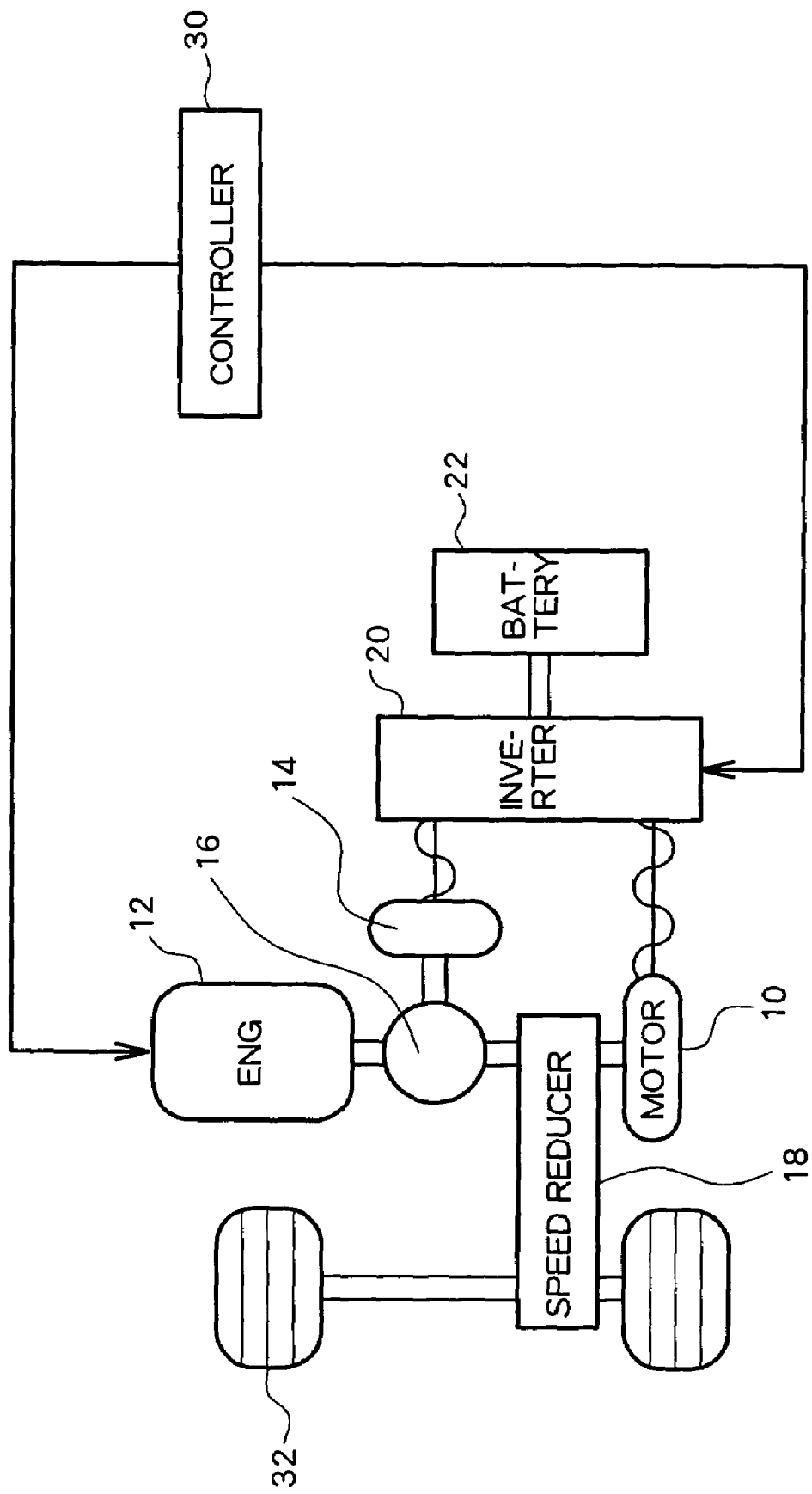
FIG. 1 is a view the configuration of a hybrid vehicle including an internal combustion engine which is a control target of a control apparatus according to an embodiment of the present invention.

FIG. 1 is a functional diagram showing an outline of a hybrid vehicle including an internal combustion engine which is a control target of a control apparatus according to the embodiment of the present invention. The hybrid vehicle in this embodiment includes a motor 10 and an engine 12 as a power source of the vehicle, and further includes a generator 14, a power transfer mechanism 16, a speed reducer 18, an inverter 20, a battery 22, a controller 30 and a driving wheel 32.

The motor 10 is constructed as an AC motor, for example, and its output shaft is connected to the driving wheel 32 via the speed reducer 18. The driving wheel 32 can be driven by driving (powering) operation of the motor 10. Further, power generation operation (regenerative braking) of the motor 10 can be performed by utilizing the rotational energy of the driving wheel 32.

As for the engine 12 as the internal combustion engine, its output shaft is connected to the driving wheel 32 via the power transfer mechanism 16 and the speed reducer 18. The driving wheel 32 can be also driven by driving the engine 12.

The generator 14 is constructed as an AC generator, for example, and its output shaft is connected to the output shaft of the engine 12 via the power transfer mechanism 16. The power generation operation of the generator 14 can be performed by driving the engine 12. Further, the engine 12 can be started by the drive of the generator 14.

The power transfer mechanism 16 distributes the drive power generated by the engine 12 to the drive power for the driving wheel 32 and the generating power for the generator 14. The power transfer mechanism 16 here is constructed by a planetary gear mechanism having a ring gear, a carrier and a sun gear, for example.

The inverter 20 is capable of converting direct-current voltage from the battery 22 into alternating-current by switching operation and supplying alternating current to each coil (not shown) of the motor 10 and the generator 14. Further, the inverter 20 is capable of conversion in the direction to convert the alternating current of each coil of the motor 10 and the generator 14 into direct current and regenerating it in a battery 22. In this way, electric energy generated by power generation of the generator 14 and regenerative braking of the motor 10 is charged in the battery 22 via the inverter 20 and used in driving the motor 10 and the generator 14.

The controller 30 controls the operational state of the motor 10 and the generator 14 by controlling the drive of the inverter 20 in accordance with the signals showing the vehicle conditions such as acceleration opening degree, vehicle speed, a brake operation amount (for example, all of them are detected by sensors not shown) and the like. The controller 30 controls starting and stopping of the engine 12 in accordance with the signals showing these vehicle conditions, and also controls the operational state when the engine 12 is driven.

Figure 2:
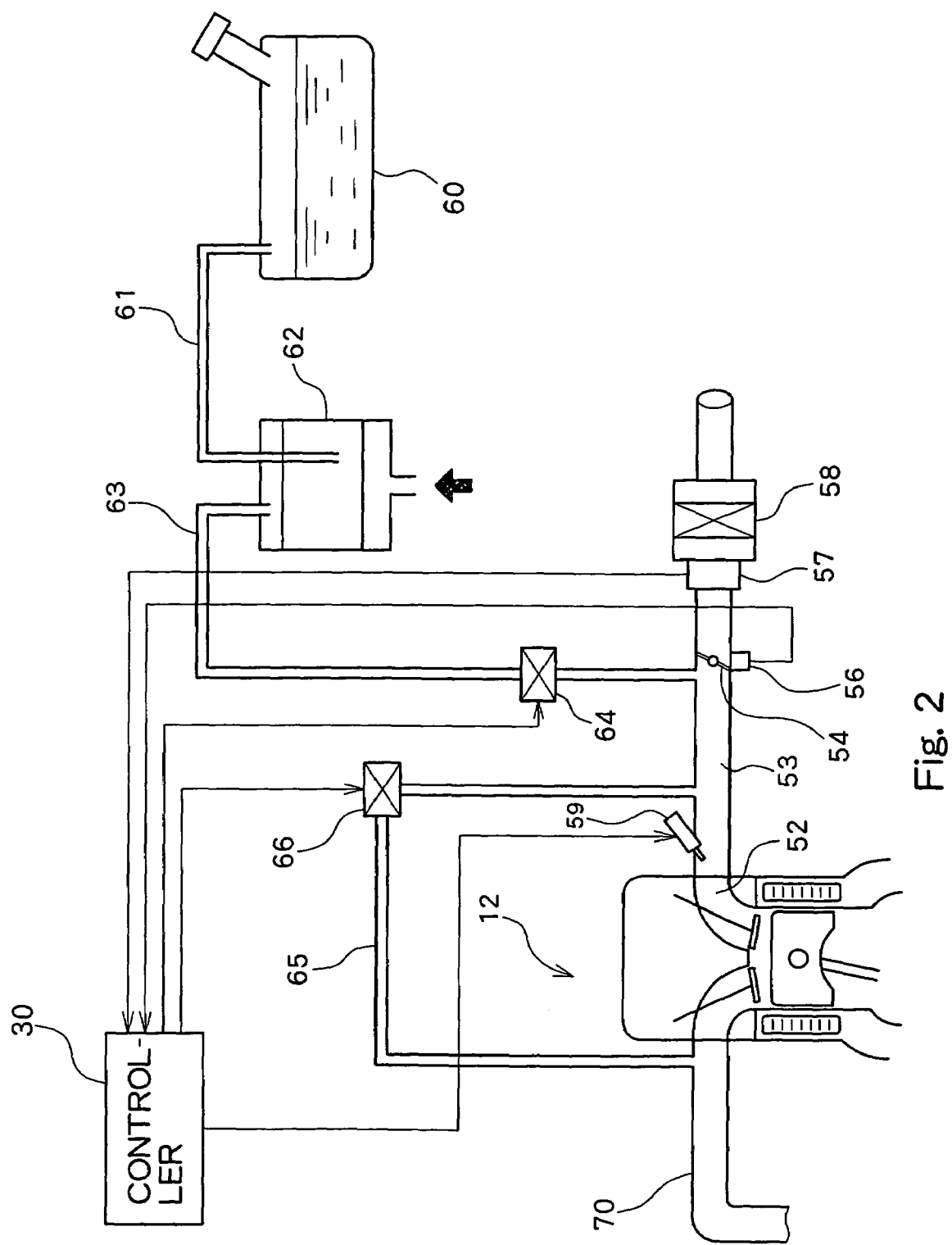
FIG. 2 is a view showing the configuration of the internal combustion engine which is the control target of the control apparatus according to the embodiment of the present invention.

FIG. 2 shows an outline of the construction of the engine 12. An air cleaner 58 is provided at the most upstream part of an intake pipe 53, and at a downstream side of the air cleaner 58, an air flow meter 57 for detecting an intake air amount is provided. A throttle valve 54 is provided at a downstream side of the air flow meter 57. The throttle valve 54 of this embodiment is an electrically controlled throttle, and the opening degree of the throttle valve 54 is controlled in accordance with a throttle control command value outputted from the controller 30. The opening degree of the throttle valve 54 is detected by a throttle opening degree sensor 56. An injector 59 is provided at a downstream side from the throttle valve 54. The injector 59 communicates with a fuel tank 60 via a fuel pipe and a fuel pump not shown, and injects the fuel supplied by the fuel pump to an intake port 52. A detection signal of the air flow meter 57 and a detection signal of the throttle opening degree sensor 56 are inputted into the controller 30.

A release passage 61 for releasing evaporated fuel gas vaporizing in the fuel tank 60 is provided extending from an upper part of the fuel tank 60. The release passage 61 communicates with an upper part of a canister 62 including an adsorption part constituted of activated carbon or the like. A fresh air inlet port communicating with atmospheric air is provided at a lower part of the canister 62, and a purge passage 63 for introducing a mixture gas of fresh air from the fresh air inlet port and the evaporated fuel gas stored in the adsorption part is extensively provided from an upper part of the canister 62.

The purge passage 63 communicates with the intake pipe 53 at a position downstream from the throttle valve 54, and the evaporated fuel gas is supplied to a downstream side from the throttle valve 54 in the intake pipe 53 as the mixture gas of the evaporated fuel gas and fresh air. A purge control valve 64 is provided at a midpoint of the purge passage 63, and the opening degree of the purge control valve 64 is controlled in accordance with a purge control command value outputted from the controller 30. Thereby, the flow rate of the evaporated fuel mixture gas supplied to a downstream side from the throttle valve 54 in the intake pipe 53, namely, the purge flow rate is controlled. The purge control command value is calculated by the controller 30 in accordance with the signals showing the operational state of the engine 12 such as the opening degree of the throttle valve 54 (detected by the throttle opening degree sensor 56) and the engine speed (detected by a sensor not shown).

An EGR passage 65 is extensively provided from an exhaust pipe 70 in which an exhaust gas flows. The EGR passage 65 communicates with the intake pipe 53 at a position downstream from the throttle valve 54, and the exhaust gas is supplied to a downstream side from the throttle valve 54 in the intake pipe 53 as the EGR gas. An EGR control valve 66 is provided at a midpoint of the EGR passage 65, and the opening degree of the EGR control valve 66 is controlled in accordance with the EGR control command value outputted from the controller 30. Thereby, the flow rate of the exhaust gas supplied to the downstream side from the throttle valve 54 in the intake pipe 53, namely, the EGR flow rate is controlled. The EGR control command value is calculated by the controller 30 in accordance with the signal showing the aforementioned operational state of the engine 12.

In this manner, in the engine 12 of this embodiment, both the evaporated fuel mixture gas and the exhaust gas are supplied at the position downstream from the throttle valve 54 in the intake pipe 53, and thereby, both the evaporated fuel purge and EGR are performed. Here, the pressure of the exhaust gas is higher than that of the evaporated fuel mixture gas, and therefore, the exhaust gas flows into the intake pipe 53 more easily than the evaporated fuel mixture gas. When the EGR flow rate increases, negative pressure in the downstream side from the throttle valve 54 in the intake pipe 53 reduces and, therefore, the purge flow rate is reduced to below the target value.

Thus, the controller 30 of this embodiment controls the opening degree of the purge control valve 64 and the opening degree of the throttle valve 54 as the operational state of the engine 12 to thereby compensate for a decrease of the purge flow rate caused by an increase in the EGR flow rate. Hereinafter, a routine for calculating target opening degree of the purge control valve 64 and target opening degree of the throttle valve 54, which is executed by the controller 30, will be explained by using the flowchart shown in FIG. 3. This routine is executed repeatedly every predetermined time when the engine 12 is operated.

First, in step (hereinafter, called S) 101, a request opening degree TAISC of the throttle valve 54 at the time of idle control of the engine 12 is calculated. Then, the flow proceeds to S102.

At S102, it is determined whether torque request of the engine 12 is present or not based on the signal indicating the aforementioned vehicle condition. When the torque request of the engine 12 is not present, namely, the result determined at S102 is NO, the process continues on to S113. On the other hand, when the torque request of the engine 12 is present, namely the result determined at S102 is YES, the process continues on to S103.

At S103, request opening degree TATRQ of the throttle valve 54 to achieve the request torque of the engine 12 is calculated. The request opening degree TATRQ of the throttle valve 54 can be calculated from the request torque of the engine 12 and engine speed NE of the engine 12. Then, the process continues on to S104.

At S104, in order to perform EGR, target opening degree TAEGR of the EGR control valve 66 is calculated as the aforementioned EGR control command value in accordance with the signal indicating the operational state of the engine 12. Then, the process continues on to S105.

At S105, in order to perform evaporated fuel purge, target opening degree TAVSV of the purge control valve 64 is calculated as the aforementioned purge control command value. Here, a target opening degree TAVSV0 of the purge control valve 64 when EGR is not performed can be calculated in accordance with the signal indicating the operational state of the aforementioned engine 12. However, when the EGR is performed at the same time as the evaporated fuel purge, the purge flow rate becomes less than the target value due to the increase in flow rate of the exhaust gas (EGR gas) flowing into the throttle valve 54 of the intake pipe 53 while the opening degree of the purge control valve 64 is controlled in accordance with the target opening degree TAVSV0.

Thus, in this embodiment, a compensation amount $\delta$VSV of the opening degree of the purge control valve 64 is calculated in accordance with the supply flow rate of the EGR gas, and the target opening degree TAVSV of the purge control valve 64 is compensated for by this compensation amount $\delta$VSV. More specifically, the compensation amount $\delta$VSV (the direction in which the purge control valve 64 opens is positive) of the opening degree of the purge control valve 64 is calculated in accordance with the target opening degree TAEGR of the EGR control valve 66, and the value obtained by adding this compensation amount $\delta$VSV to the target opening degree TAVSV0 is set as the target opening degree TAVSV of the purge control valve 64. Thereby, the decrease in the purge flow rate resulting from the increase in the supply flow rate of the EGR gas can be compensated for. The compensation amount $\delta$VSV of the opening degree of the purge control valve 64 can be set, for example, analytically or experimentally, and the compensation amount $\delta$VSV of a larger value is set with the increase in the target opening degree TAEGR of the EGR control valve 66. Then, the process continues on to S106.

At S106, it is determined whether the target opening degree TAVSV of the purge control valve 64 calculated at S105 is larger than fully opened opening degree ALVSV of the purge control valve 64 or not. When the result determined at S106 is NO, it is determined that a desired purge flow rate can be obtained by the compensation of the opening degree of the purge control valve 64, and the process continues on to S111. On the other hand, when the result determined at S106 is YES, it is determined that the desired purge flow rate cannot be obtained by only the compensation of the opening degree of the purge control valve 64, and the process continues on to S107.

At S107, an upper limit value TAGD of the opening degree of the throttle valve 54 is calculated. Here, the upper limit value TAGD of the opening degree of the throttle valve 54 is changed in accordance with the supply flow rate of the EGR gas. More specifically, the upper limit value TAGD is set in accordance with the target opening degree TAEGR of the EGR control valve 66 so that negative pressure at a downstream side from the throttle valve 54 in the intake pipe 53 is a substantially fixed value when the opening degree of the throttle valve 54 is the upper limit value TAGD. Setting of this upper limit value TAGD can be performed analytically or experimentally, for example. Then, the process continues on to S108.

At S108, it is determined whether the sum of the request opening degree TATRQ calculated at S103 and the request opening degree TAISC calculated at S101 is larger than the upper limit value TAGD calculated at S107 or not. When the result determined at S108 is NO, the process continues on to S111. On the other hand, when the result determined at S108 is YES, the process continues on to S109.

At S109, a throttle guard flag XGD is set at ON to show that the opening degree of the throttle valve 54 is restricted. Then, the process continues on to S110.

At S110, a target opening degree TA of the throttle valve 54 when the opening degree of the throttle valve is limited is calculated. Here, the upper limit value TAGD of the opening degree of the throttle valve 54 calculated at S107 is made the target opening degree TA of the throttle valve 54. The opening degree of the throttle valve 54 is controlled so that the opening degree of the throttle valve 54 becomes the target opening degree TA. Thereby, the opening degree of the throttle valve 54 is restricted so as not to exceed the upper limit value TAGD, and, therefore, the negative pressure of a predetermined amount or more can be secured in the downstream side from the throttle valve 54 in the intake pipe 53. The target opening degree TAVSV of the purge valve 64 is set at the full opening degree ALVSV. Then, the opening degree of the purge control valve 64 is controlled so that the opening degree of the purge control valve 64 becomes the full opening degree ALVSV. Then, the processing is finished.

On the other hand, when the result determined at S106 or S108 is NO, the throttle guard flag XGD is set at off to show that the opening degree of the throttle valve 54 is not restricted at S111. Then, the process continues on to S112.

At S112, the target opening degree TA of the throttle valve 54 when the opening degree of the throttle valve 54 is not restricted is calculated. Here, the sum of the request opening degree TAISC calculated at S101 and the request opening degree TATRQ calculated at S103 is set as the target opening degree TA of the throttle valve 54. Then, the opening degree of the throttle valve 54 is controlled so that the opening degree of the throttle valve 54 becomes the target opening degree TA. The opening degree of the purge control valve 64 is controlled so that the opening degree of the purge control valve 64 becomes the target opening degree TAVSV calculated at S105. Then, the processing by this routine is finished.

When the result determined at S102 is NO, the throttle guard flag XGD is set at off to show that the opening degree of the throttle valve 54 is not restricted, at S113. Then, the process continues on to S114.

At S114, the target opening degree TA of the throttle valve 54 when the torque request of the engine 12 is not present is calculated. Here, the request opening degree TAISC calculated at S101 is set as the target opening degree TA of the throttle valve 54. Then, the opening degree of the throttle valve 54 is controlled so that the opening degree of the throttle valve 54 becomes the target opening degree TA. Then, the processing by this routine is finished.

Figure 4:
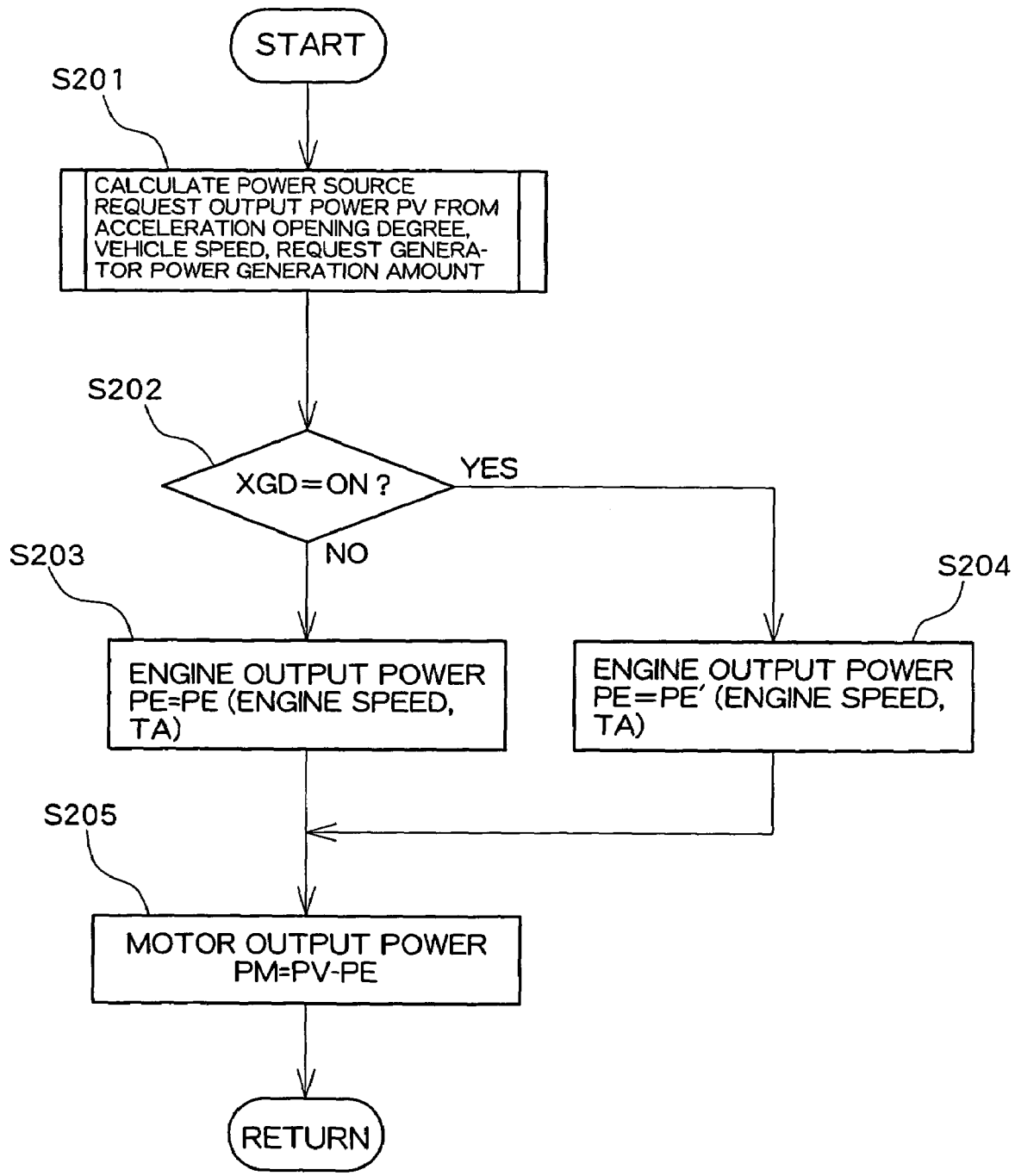
FIG. 4 is a flowchart of a process for calculating a target output power of a motor.

When the opening degree of the throttle valve 54 is changed in the above routine, the drive torque generated by the engine 12 changes, and therefore, the output power occurring to the driving wheel 32 also changes to cause a deviation between the output power occurring to the driving wheel 32 and the request output power. However, in the hybrid vehicle, the change in the output power occurring to the driving wheel 32 can be compensated by also changing the output power of the motor 10 in accordance with the change in the opening degree of the throttle valve 54. Hereinafter, the routine for calculating the target output power of the motor 10 to compensate the change in the output power occurring to the driving wheel 32 will be explained by using the flowchart shown in FIG. 4. This routine is executed repeatedly every predetermined time when the engine 12 is operated.

First, at S201, a power source request output power PV is calculated. The power source request output power PV is the sum of the target output power of the engine 12 and the target output power of the motor 10, and can be calculated from, for example, the accelerator opening degree, the vehicle speed and the generation electric power of the generator 14 requested from the capacity of the battery 22. Then, the process continues on to S202.

At S202, it is determined whether the opening degree of the throttle valve 54 is restricted or not, namely, whether the throttle guard flag XGD is on or not. When the throttle guard flag XGD is off, namely, when the result determined at S202 is NO, the process continues on to S203. On the other hand, when the throttle guard flag XGD is on, namely, when the result determined at S202 is YES, the process continues on to S204.

At S203, a target output power PE of the engine 12 when the opening degree of the throttle valve 54 is not restricted is calculated. The target output power PE of the engine 12 can be calculated from the engine speed NE and the target opening degree TA=TATRQ+TAISC of the throttle valve 54 calculated at S112, or the engine speed NE and the target opening degree TA=TAISC of the throttle valve 54 calculated at S114. The process continues on to S205.

At S204, the target output power PE of the engine 12 when the opening degree of the throttle valve 54 is restricted is calculated. The target output power PE of the engine 12 here can be calculated from the engine speed NE and the target opening degree TA=TAGD of the throttle valve 54 calculated at S110. Then, the process continues on to S205.

At S205, a target output power PM of the motor 10 is calculated. The target output power PM of the motor 10 is calculated by the difference between the power source request output power PV and the target output power PE of the engine 12. Then, the drive of the inverter 20 is controlled by the controller 30 so that the output power of the motor 10 becomes this target output power PM. Then, the processing by this routine is finished.

By executing the above routine, any decrease in the output power occurring to the driving wheel 32 can be compensated for by increasing the output power of the motor 10, even if the opening degree of the throttle valve 54 decreases and the drive torque generated by the engine 12 decreases. Accordingly, even if the opening degree of the throttle valve 54 decreases, there is barely any change in the output power provided to the driving wheel 32.

As explained above, in this embodiment, the opening degree of the throttle valve 54 is restricted so as not to exceed the upper limit value TAGD, and thereby negative pressure of a predetermined amount or more can be secured in the downstream side from the throttle valve 54, of the intake pipe 53. Because a decrease in the purge flow rate, which is caused by the increase in the EGR flow rate, can be compensated for by restricting the opening degree of the throttle valve 54, a desired purge flow rate can be sufficiently secured, even if the EGR flow rate is increased. Accordingly, enhanced fuel economy and reduction in the exhaust emission by the EGR can be realized while enhancing the evaporated fuel purge ability.

Further, restriction of the degree of opening of the throttle valve 54 is performed when it is determined that the desired purge flow rate cannot be obtained by only the control of compensating the opening degree of the purge control valve

64 in accordance with the EGR flow rate. Thereby, even when the desired purge flow rate cannot be obtained by only the control of the opening degree of the purge control valve 64, the desired purge flow rate can be sufficiently secured by restricting the opening degree of the throttle valve 54.

The upper limit value TAGD of the opening degree of the throttle valve 54 is set so that the negative pressure in the downstream side from the throttle valve 54, of the intake pipe 53 becomes a substantially fixed value in the case where the opening degree of the throttle valve 54 is the upper limit value TAGD. By setting the upper limit value TAGD in this manner, the negative pressure of a predetermined amount or more can be stably secured in the downstream side from the throttle valve 54, of the intake pipe 53 even when the EGR flow rate changes.

In this embodiment, by increasing the output power of the motor 10 in accordance with the decrease in the opening degree of the throttle valve 54, the decrease in the output power occurring to the driving wheel 32 can be compensated for, and therefore, even if the opening degree of the throttle valve 54 decreases, the control can be performed so that there is negligible change in the output power provided to the driving wheel 32.

The art of restricting the throttle opening degree so as to secure sufficient intake pipe negative pressure to enable supply of the EGR gas to the intake pipe and of adjusting the fuel supply amount so as to secure the output power of the engine is disclosed in Japanese Patent Laid-open No. 9-250376. However, compensating for the reduction of the purge flow rate caused by the increase in the EGR flow rate is not disclosed in that publication. Accordingly, this embodiment differs from that art in concept.

Figure 3:
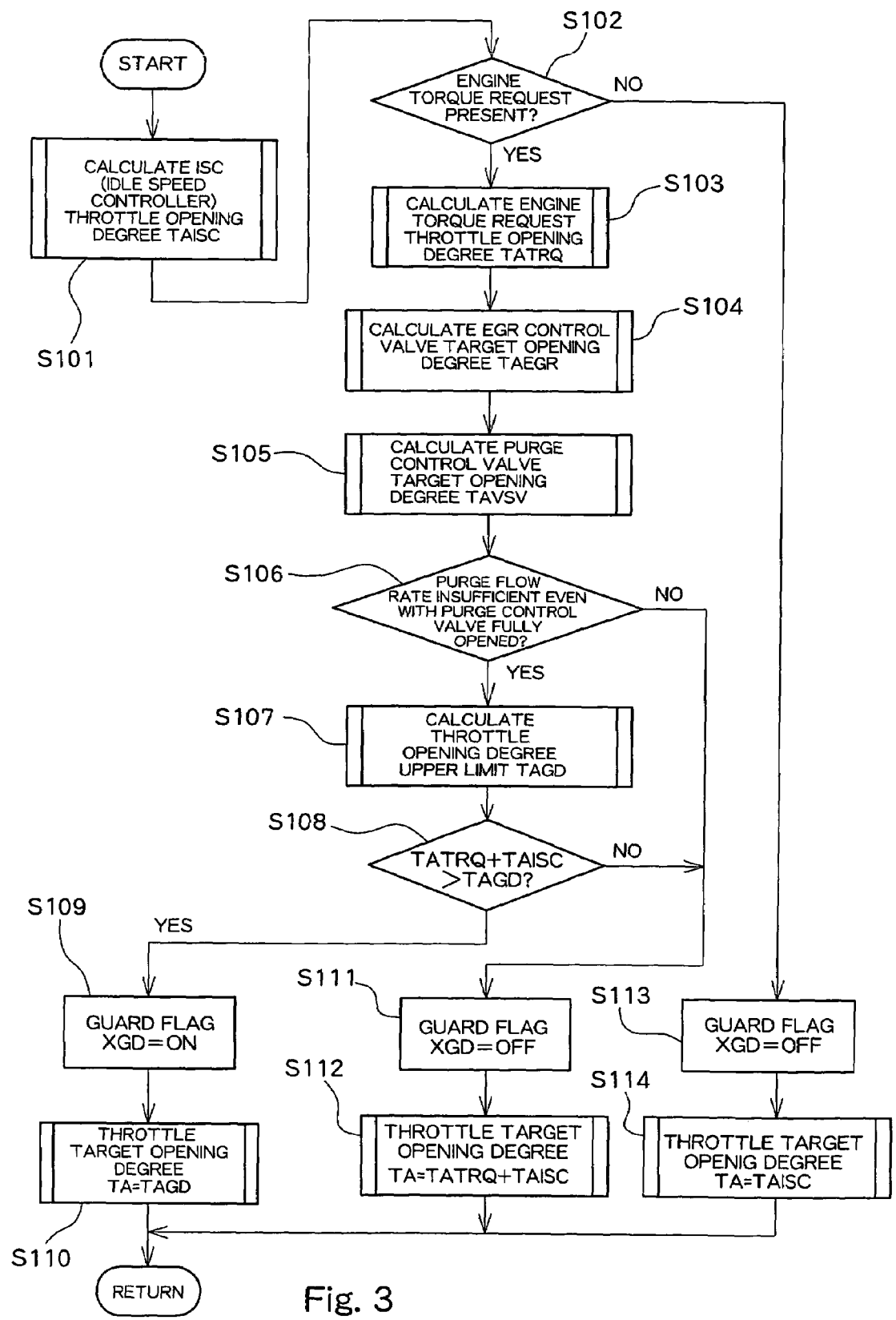
FIG. 3 is a flowchart of a process for calculating a target opening degree of a purge control valve and a target opening degree of a throttle valve.

In the above explanation, an example wherein the opening degree of the throttle valve 54 is restricted when it is determined that the desired purge flow rate cannot be obtained through compensation of only the opening degree of the purge control valve 64 at S106 of the flowchart in FIG. 3 is described. In this embodiment, the compensation amount δTA of the opening degree of the throttle valve 54 is calculated in accordance with the supply flow rate of the EGR gas when it is determined that the desired purge flow rate cannot be obtained by only the compensation of the opening degree of the purge control valve 64 at S106, and the target opening degree TA of the throttle valve 54 can be also compensated for by this compensation amount δTA. The decrease of the negative pressure in the intake pipe 53 downstream side from the throttle valve 54, which occurs due to increase in the EGR flow rate, can be also compensated for by the compensation of the target opening degree TA of the throttle valve 54, and, therefore, the desired purge flow rate can be sufficiently secured.

In such a case, at S107 of the flowchart in FIG. 3, the compensation amount δTA (the direction in which the throttle valve 54 closes is positive) of the opening degree of the throttle valve 54 is calculated in accordance with the target opening degree TAEGR of the EGR control valve 66. Here, the compensation amount δTA of the opening degree of the throttle valve 54 can be set analytically or experimentally, for example, and the compensation amount δTA of a large value is set with increase of the target opening degree TAEGR of the EGR control valve 66. Then, S108 of the flowchart in FIG. 3 is omitted, and at S110, TAISC+TATRQ−δTA is set as the target opening degree TA of the throttle valve 54. The flag XGD in this case is a flag showing whether the opening degree of the throttle valve 54 is compensated or not.

In the above description, a hybrid vehicle including an internal combustion engine was described as an example. However, the control apparatus according to this embodiment can be also applied to the vehicles other than hybrid vehicles.

Figure 5:
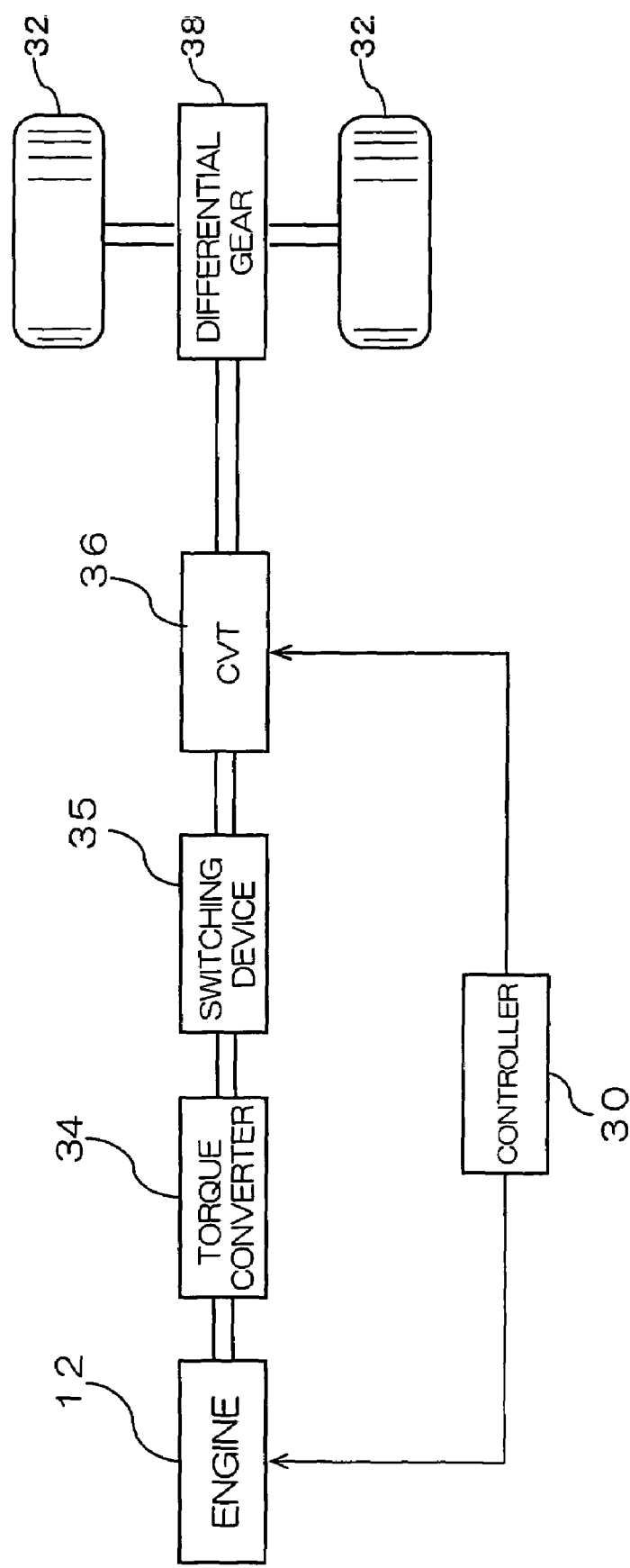
FIG. 5 is a view showing another configuration of a vehicle including the internal combustion engine which is the control target of the control apparatus according to the embodiment of the present invention.

In a vehicle which can transmit drive torque generated by the engine 12 to the driving wheel 32 by shifting the drive torque by a continuously variable transmission 36, change in the output power occurring to the driving wheel 32 can be compensated for by changing the transmission ratio of the continuously variable transmission 36 in accordance with the change in the opening degree of the throttle valve 54. In the vehicle of the construction shown in FIG. 5, the drive torque generated by the engine 12 is transmitted to the driving wheel 32 via the torque converter 34, a forward and reverse travel switching device 35, the continuously variable transmission 36 and a differential gear 38.

Figure 6:
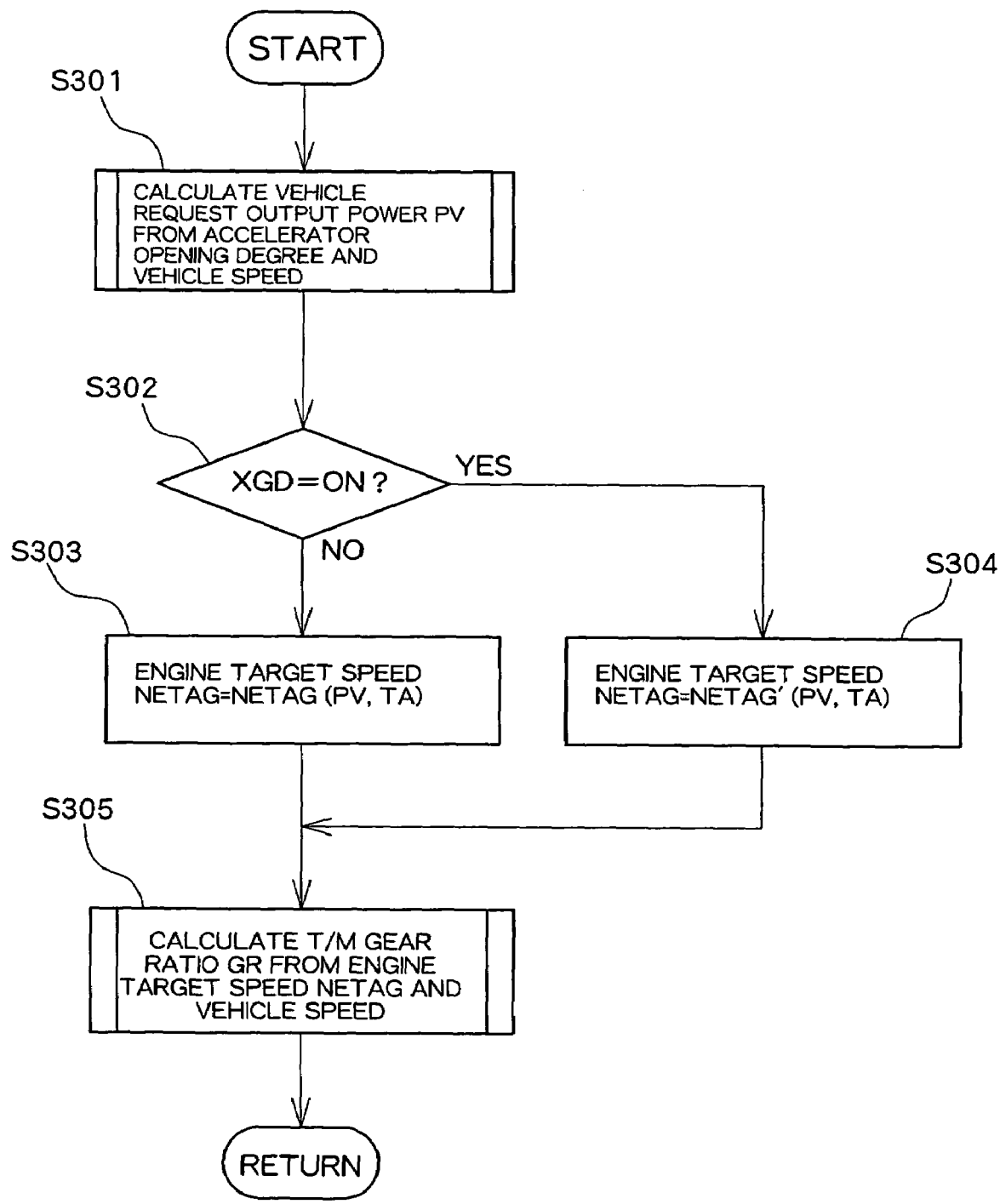
FIG. 6 is a flowchart of a process for calculating a target transmission ratio of a continuously variable transmission.

Hereinafter, a routine for calculating the target transmission ratio of the continuously variable transmission 36 to compensate for the change in the output power occurring to the driving wheel 32 will be explained with reference to the flowchart shown in FIG. 6. This routine is executed repeatedly at predetermined intervals.

First, at S301, the vehicle request output power PV is calculated. The vehicle request output power PV here can be calculated from the accelerator opening degree and the vehicle speed, for example. Then, the process continues on to S302.

At S302, it is determined whether the opening degree of the throttle valve 54 is restricted or not, namely, whether the throttle guard flag XCD is on or not. When the throttle guard flag XGD is off, namely, when the result determined at S302 is NO, the process continues on to S303. On the other hand, when the throttle guard flag XGD is on, namely, when the result determined at S302 is YES, the process continues on to S304.

At S303, a target engine speed NETAG of the engine 12 when the opening degree of the throttle valve 54 is not restricted is calculated. The target engine speed NETAG of the engine 12 here can be calculated from the vehicle request output power PV and the target opening degree TA=TATRQ+TAISC of the throttle valve 54 calculated at S112, or the vehicle request output power PV and the target opening degree TA=TAISC of the throttle valve 54 calculated at S114. Then, the process continues on to S305.

At S304, the target engine speed NETAG of the engine 12 when the opening degree of the throttle valve 54 is restricted is calculated. The target engine speed NETAG of the engine 12 can be calculated from the vehicle request output power PV and the target opening degree TA=TAGD of the throttle valve 54 calculated at S110. Then, the process continues on to S305.

At S305, a target transmission ratio Gr of the continuously variable transmission 36 is calculated. The target transmission ratio Gr of the continuously variable transmission 36 is calculated from the vehicle speed and the target engine speed NETAG of the engine 12. Then, the transmission ratio of the continuously variable transmission 36 is controlled by the controller 30 so that the transmission ratio of the continuously variable transmission 36 becomes the target transmission ratio Gr. Then, the processing by this routine is finished.

By executing the above routine, the decrease in the output power occurring to the driving wheel 32 can be compensated for by increasing the engine speed of the engine 12 by downshifting the transmission ratio of the continuously variable transmission 36, even if the opening degree of the throttle valve 54 decreases and the drive torque generated by the engine 12 decreases. Accordingly, the control can be performed so that the output power occurring to the driving wheel 32 hardly changes even if the opening degree of the throttle valve 54 decreases.

Although the preferred embodiment of the present invention is explained above, the present invention is not limited to the illustrative examples, and the present invention can be embodiment out in various modes within the scope of the claims and without deviating from the spirit of the present invention.

What is claimed is:

1. A control apparatus of an internal combustion engine for controlling an amount of an evaporated fuel and an amount of an exhaust gas supplied downstream from a throttle valve of an intake pipe, comprising:

a compensation control device for controlling an operational state of the internal combustion engine to compensate for a decrease in the supply amount of the evaporated fuel caused by an increase in the supply amount of the exhaust gas, wherein the supply amount of the evaporated fuel is controlled by controlling an opening degree of a purge control valve, and wherein said compensation control device controls the opening degree of the purge control valve to compensate for the decrease in the supply amount of the evaporated fuel caused by the increase in the supply amount of the exhaust gas, and wherein said compensation control device, upon determining that a desired supply amount of evaporated fuel cannot be obtained by the control of the opening degree of the purge control valve, controls the opening degree of the throttle valve to compensate for the decrease in the supply amount of the evaporated fuel.

* * * * *